UNITED STATES PATENT OFFICE.

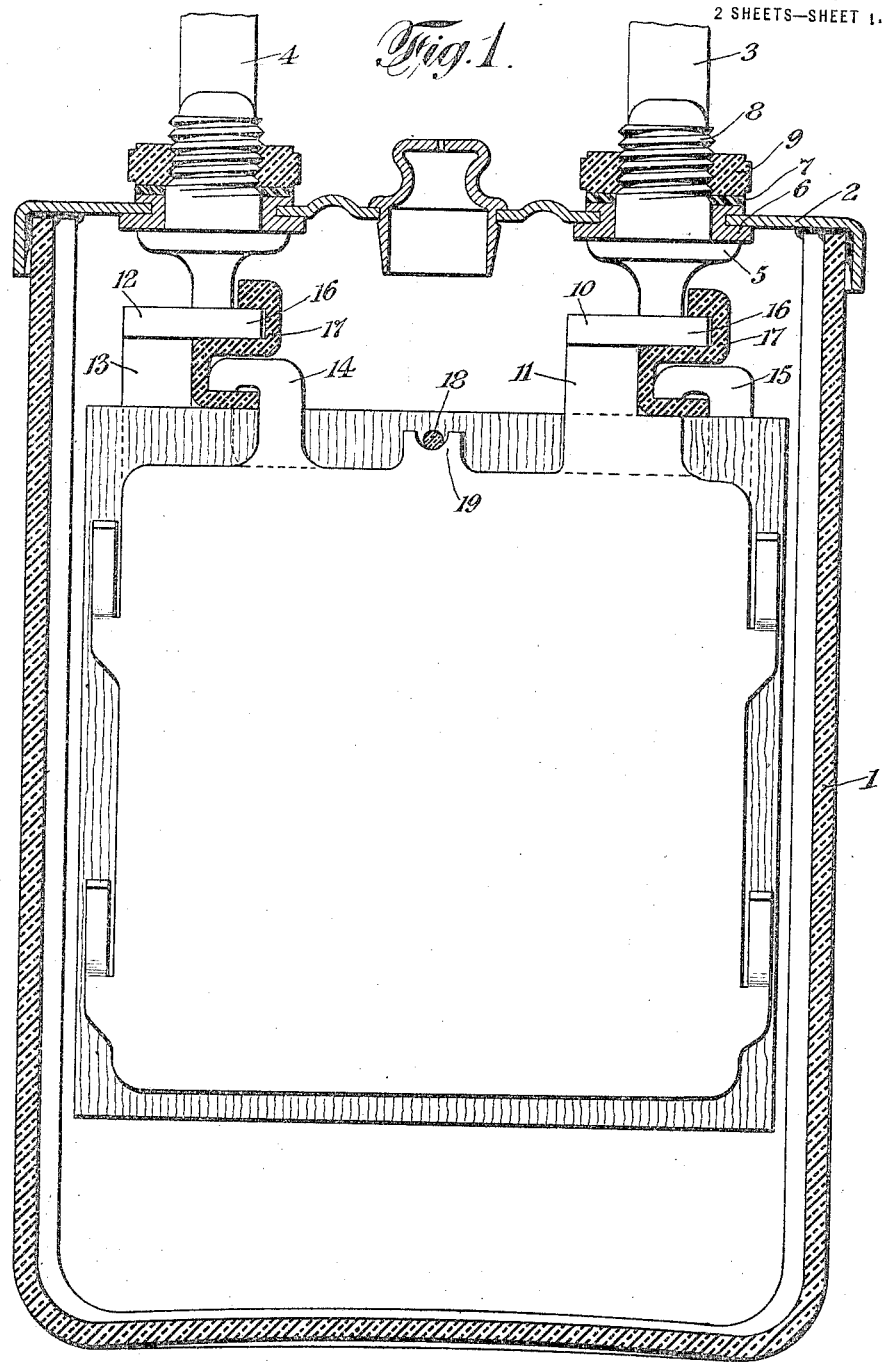

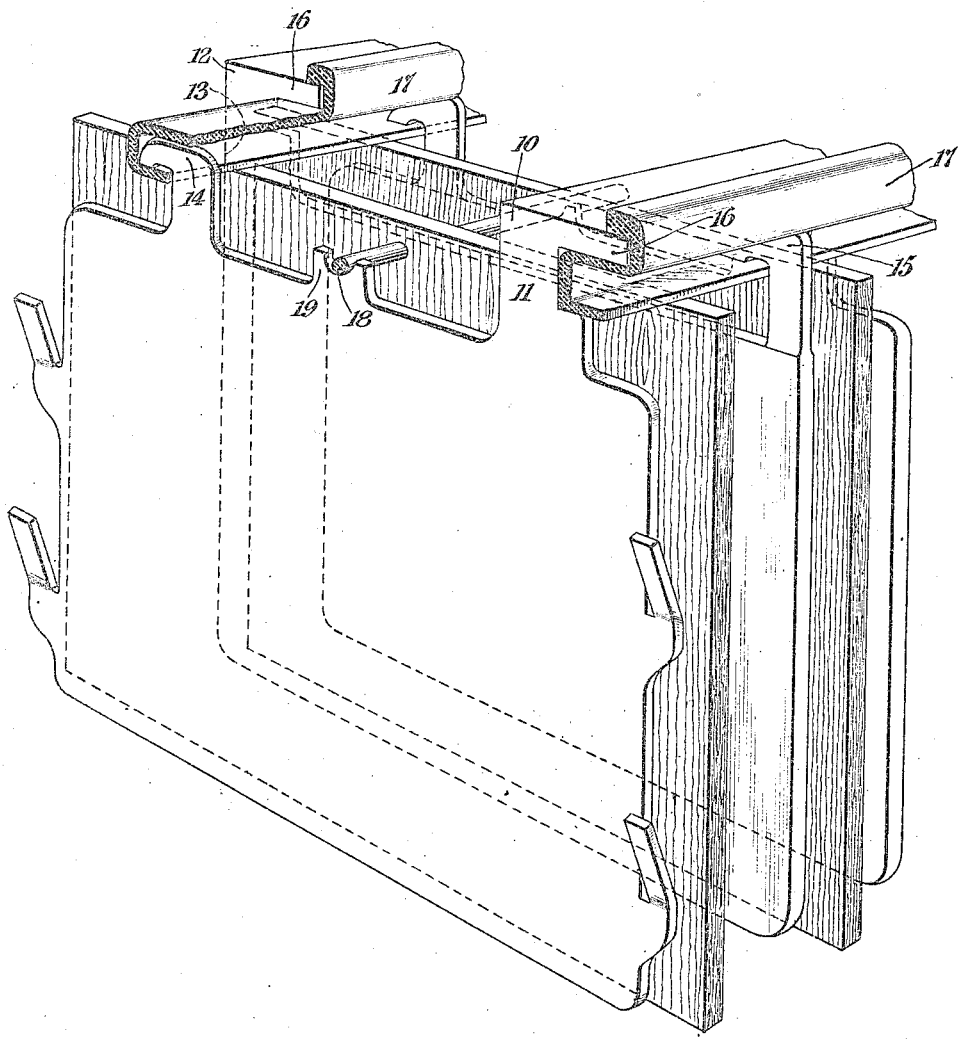

WILLIAM S. GOULD, OF NEW YORK, N. Y., ASSIGNOR TO GOULD STORAGE BATTERY COMPANY, A CORPORATION OF NEW YORK.

STORAGE BATTERY.

1,363,646.   Specification of Letters Patent.   Patented Dec. 28, 1920.

Application filed July 23, 1920. Serial No. 398,548.

*To all whom it may concern:*

Be it known that I, WILLIAM S. GOULD, a citizen of the United States, residing in the city, county, and State of New York, (whose post-office address in c/o Gould Storage Battery Company, 30 East 42nd street, New York city, N. Y.,) have invented certain new and useful Improvements in Storage Batteries, of which the following is a specification.

My invention relates to storage batteries and particularly to means for supporting free ends of the plates and also means for supporting separators in place.

My invention will be better understood by reference to the following specification in connection with the accompanying drawings forming a part thereof in which—

Figure 1 shows a sectional elevation of a battery and

Fig. 2 shows in perspective some of the parts assembled but separated in order to more clearly show the relation of the parts.

The battery comprises the usual jar 1 having a cover 2 of lead antimony compound. The cover 2 is provided with openings through which extend terminals 3 and 4. These terminals are attached to the cover as follows:

They are provided with an enlargement 5 engaging a member 6 placed between the cover 2 and the terminal. Placed on the top of the member 6 is a gasket 7. The terminals are screw-threaded at 8, and 9 is a nut composed of hard rubber or other suitable material which is screwed on to the threads 8 and which holds the enlargements 5 up tightly against the member 6, thus forming a gas tight joint between the terminal and the cover. The terminal 3 is connected by a bus bar 10 with the plates 11 and the terminal 4 is connected by a bus bar 12 to the plates 13. Each of the plates, therefore, has a terminal end and a free end. The free end of the plates 11 is provided with an upwardly extending projection 14 and the plates 13 are provided with upwardly extending projections 15. The bus bars 10 and 12 have a horizontal projection 16 thereon and a supporting member 17, having a general S shaped cross-section, engages the top of the projection 16 and supports the free ends of the plates through the projections 14 and 15 which rest on top of the supporting surface of the member 17. By reason of the particular configuration of the members 17 they form a cover for the projections 14 and 15 in addition to forming a support for the ends of the plates.

In this construction the separators are supported from a rod 18 which, rests upon the projections 19 on the plates.

Having described my invention what I now claim as new and desire to secure by Letters Patent is:

1. A storage battery comprising a jar containing positive and negative plates each having a terminal end and a free end, said positive and negative plates being grouped and a bar connecting them together respectively at opposite sides of the jar, a projection on the free end of each plate extending partly under the bar at that side of the jar and a support of insulating material supported by said bar and carrying said projection.

2. A storage battery comprising a jar containing positive and negative plates each having a terminal end and a free end, said positive and negative plates being grouped, and a bar connecting them together respectively at opposite sides of the jar, a projection on the free end of each plate and adjacent the bar at that end of the jar, a support of insulating material having a general S shape in cross section, the top of said support resting on said bar and the bottom thereof supporting the said projections and acting as a cover therefor to prevent short-circuits as by sediment deposit.

3. A storage battery comprising a jar containing positive and negative plates each having a terminal end and a free end, said positive and negative plates being grouped and a bar connecting them together respectively at opposite sides of the jar, a projection on the free end of each plate and adjacent said bar and a support for the free ends of the plates comprising a piece of insulating material hooked over the edge of said bar and under said projections.

In testimony whereof I have signed my name to this specification.

WILLIAM S. GOULD.